US007775888B2

(12) United States Patent
Wudtke

(10) Patent No.: US 7,775,888 B2
(45) Date of Patent: Aug. 17, 2010

(54) GAMING DEVICE HAVING A MOVABLE TOP BOX

(75) Inventor: Karl Wudtke, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 654 days.

(21) Appl. No.: 11/740,234

(22) Filed: Apr. 25, 2007

(65) Prior Publication Data

US 2008/0265503 A1 Oct. 30, 2008

(51) Int. Cl.
*A63F 13/00* (2006.01)
(52) U.S. Cl. .............................. 463/46; 463/16; 463/20
(58) Field of Classification Search ................... 463/20, 463/46, 16; 263/407
See application file for complete search history.

(56) References Cited

U.S. PATENT DOCUMENTS

| | | | | |
|---|---|---|---|---|
| 6,659,467 | B2 * | 12/2003 | Ross | 273/407 |
| 6,905,407 | B2 * | 6/2005 | Nordman | 463/20 |
| 7,572,185 | B2 * | 8/2009 | Seelig et al. | 463/32 |
| 2004/0009807 | A1 * | 1/2004 | Miller et al. | 463/20 |
| 2005/0049028 | A1 | 3/2005 | Gornez et al. | |
| 2005/0054422 | A1 * | 3/2005 | Rothkranz et al. | 463/20 |
| 2005/0215325 | A1 * | 9/2005 | Nguyen et al. | 463/46 |
| 2007/0111776 | A1 * | 5/2007 | Griswold et al. | 463/16 |

* cited by examiner

*Primary Examiner*—James S McClellan
*Assistant Examiner*—Ankit Doshi
(74) *Attorney, Agent, or Firm*—Andrew B. Chen; Marvin A. Hein

(57) ABSTRACT

Various embodiments disclosed herein are directed to gaming machines having movable top boxes. According to one embodiment, the gaming machine includes a main cabinet having a first display for presenting a game and an extendable top box coupled to the top of the main cabinet. In one embodiment, the top box includes a front surface and an opposite back surface. The top box abuts the top of the main cabinet in a first position, and the top box is in a vertical position away from the top of the main cabinet in a second position.

20 Claims, 9 Drawing Sheets

FIG. 1A
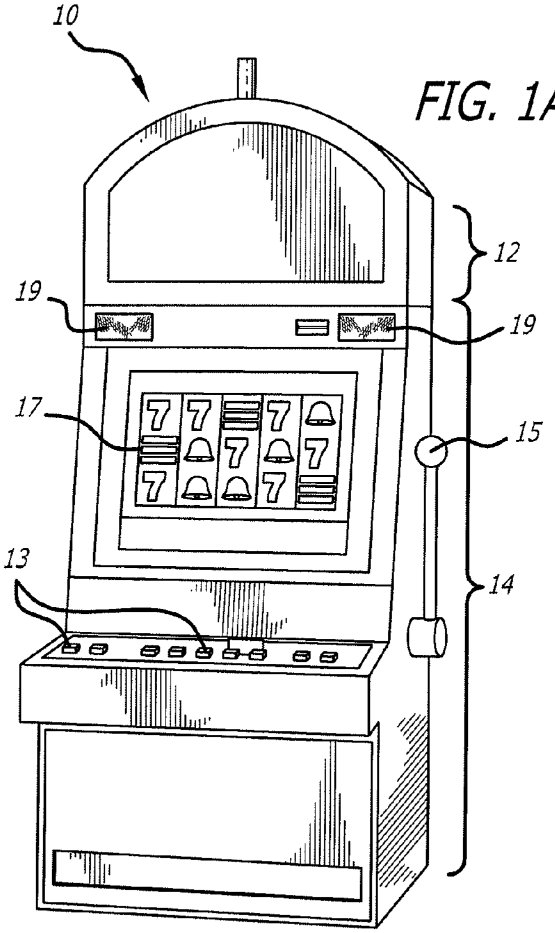
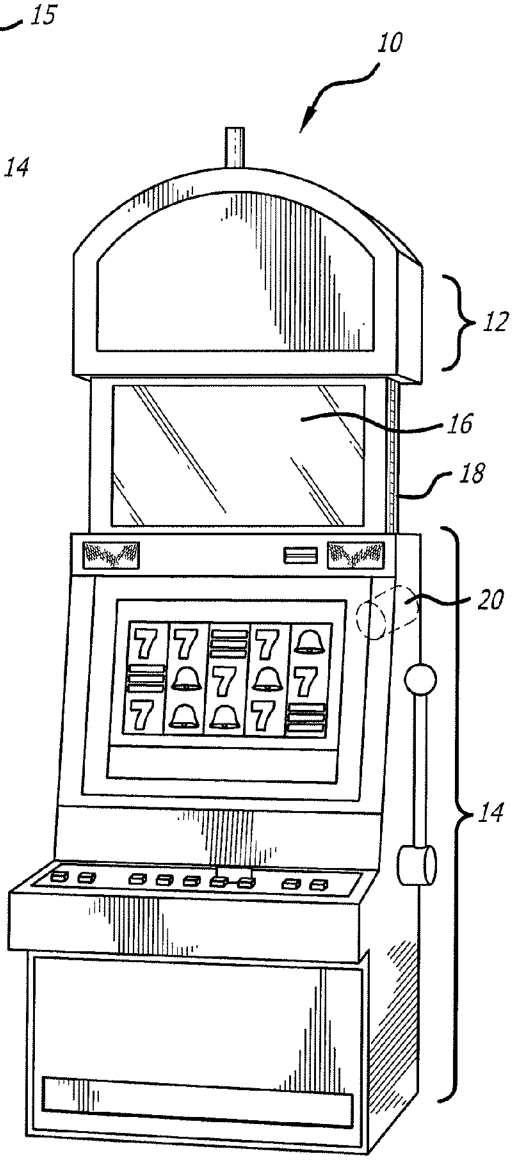
FIG. 1B

FIG. 7A
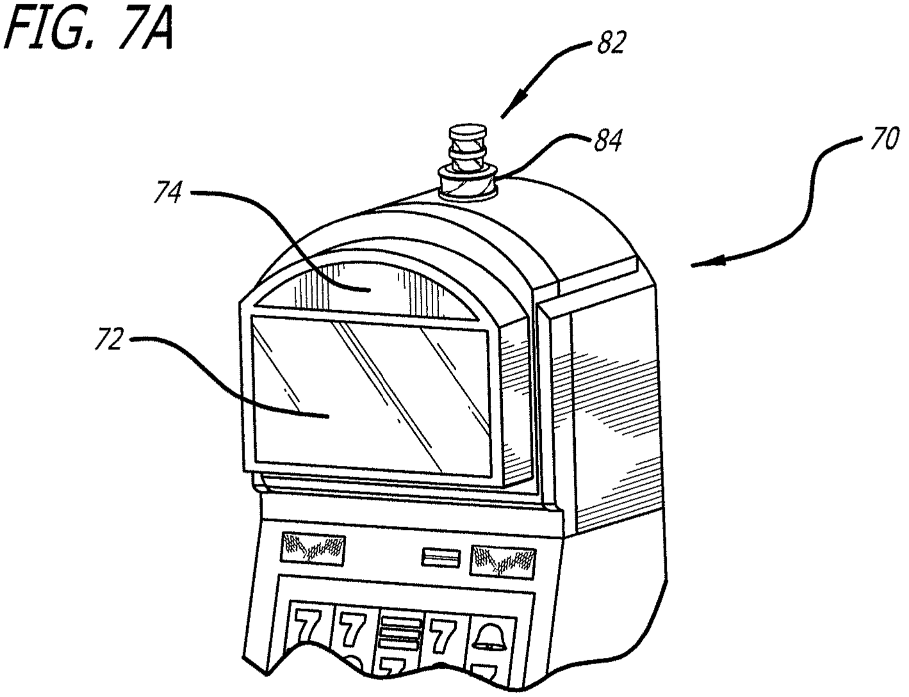
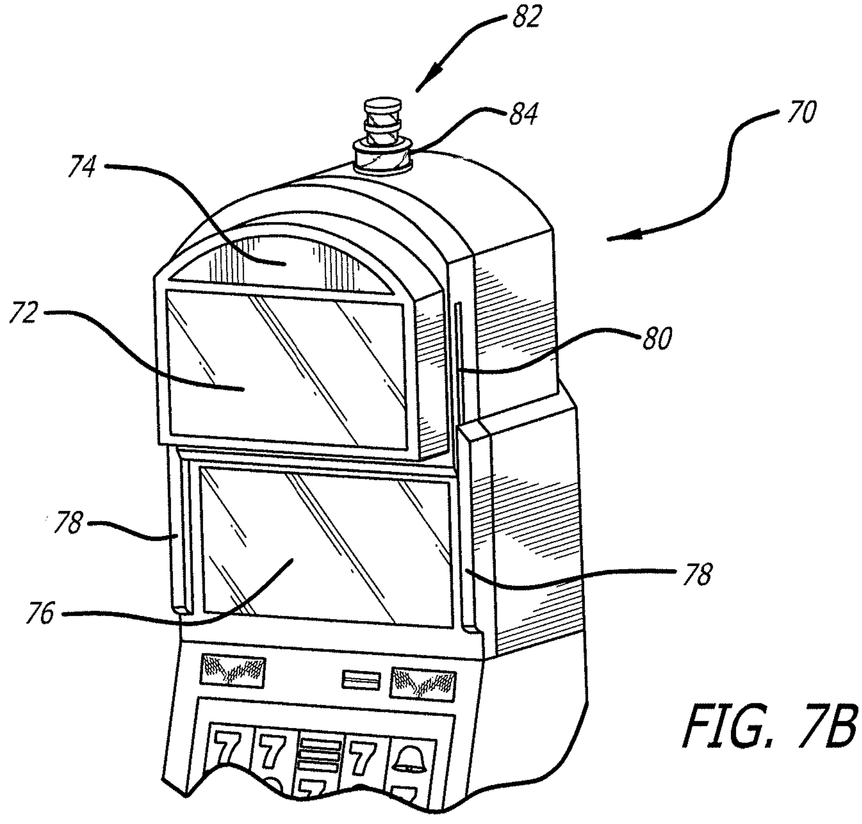
FIG. 7B

GAMING DEVICE HAVING A MOVABLE TOP BOX

CROSS-REFERENCE TO RELATED APPLICATIONS

This application is related to co-pending U.S. patent application Ser. No. 11/740,229, concurrently filed Apr. 25, 2007 entitled METHODS AND GAMING DEVICES HAVING A MOVABLE TOP BOX.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Gaming machines have been developed that have various features designed to capture and maintain player interest. Traditionally, gaming machines garner player interest by providing the player with the opportunity to win cash awards based upon a player's wager. Accordingly, various types of games or game features have been developed to provide players with the opportunity to win large sums of money for a small wager. For example, games may include one or more bonus games or the opportunity to win progressive jackpots in order to maintain player interest.

Additionally, over the years, gaming machines have grown in both sophistication and gaming features to maintain player interest. For example, the mechanical reels of traditional gaming machines have been replaced with video depictions of spinning reels. These video gaming machines provide a richer gaming experience for players by including graphics or animation as part of the game. While current gaming machines are successful, there is a continuing need for slot machine variants that provide a player with enhanced excitement.

SUMMARY

Briefly, and in general terms, various embodiments are directed to gaming machines having movable top boxes. According to one embodiment, the gaming machine includes a main cabinet having a first display for presenting a game and an extendable top box coupled to the top of the main cabinet. In another embodiment, the top box includes a front surface and an opposite back surface. The top box abuts the top of the main cabinet in a first position, and, in a second position the top box is in a vertical position away from the top of the main cabinet.

In another embodiment, the gaming machine includes a main cabinet having a first display for presenting a game and an extendable top box coupled to the top of the main cabinet. The top box abuts the top of the main cabinet in a first position, and the top box is moved in a vertical direction relative to the top of the main cabinet to a second position to reveal a secondary display.

In yet another embodiment, the gaming machine includes a main cabinet having a first display for presenting a game. The gaming machine also includes an extendable top box rotatably coupled to the top of the main cabinet. The top box includes a front surface that is visible in a first position and an opposite back surface that is visible in a second position. The gaming machine also includes a means for rotating the top box between the first position and the second position.

Other features and advantages will become apparent from the following detailed description, taken in conjunction with the accompanying drawings, which illustrate by way of example, the features of the various embodiments.

BRIEF DESCRIPTION OF THE DRAWINGS

FIG. 1A is a perspective view of one embodiment of a gaming machine having a movable top box;

FIG. 1B is a perspective view of the gaming machine of FIG. 1A having the movable top box extended;

FIG. 7A is a perspective view of another embodiment of an extendable top box;

FIG. 7B is a perspective view of the top box of FIG. 7A in an extended position.

DETAILED DESCRIPTION

Figure 2A:
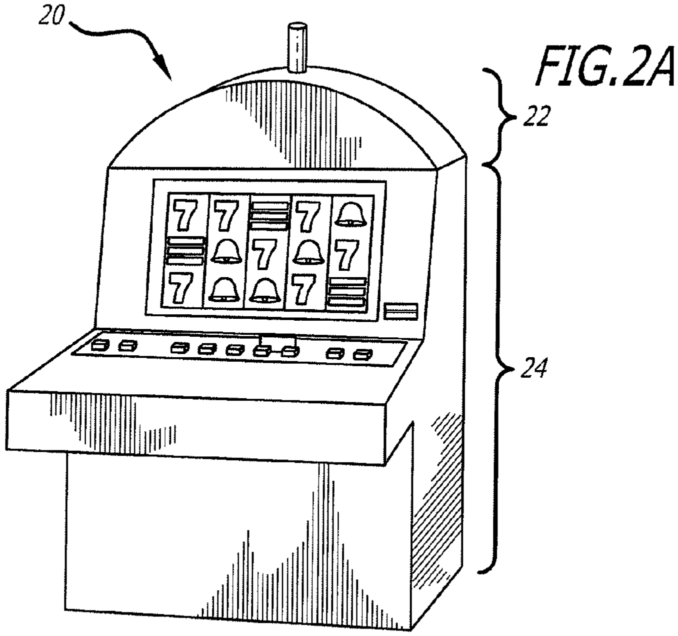
FIG. 2A is a perspective view of another gaming machine having a movable top box.

Various embodiments are directed to gaming machines having a movable top box. The top box transforms in response to one or more triggering events. For example, the top box may move in a vertical direction away from the main cabinet to create a taller and physically bigger gaming machine. Alternatively, the top box may also spin, rotate, rock, oscillate or otherwise move to provide a player with a more exciting gaming experience.

Referring now to the drawings, wherein like reference numerals denote like or corresponding parts throughout the drawings and, more particularly to FIGS. 1-6, there are shown various embodiments of a gaming machine having a movable top box. More specifically, as shown in FIG. 1A, the gaming machine 10 includes a top box 12 and a main cabinet 14. According to one embodiment, the top box 12 is a separate and distinct component that is affixed to the main cabinet 14. In another embodiment, the top box 12 is an area that is partitioned from the main cabinet 14. Alternatively, the top box 12 and the main cabinet 14 may be contiguous areas with the outward appearance of two distinct components. According to one embodiment, the top box 12 includes a display glass. The display glass may include the name of the game, artwork, game instructions, pay table, or other information relating to the game. According to another embodiment, the top box 12 includes a secondary display for displaying game information (e.g., name of the game, animation, one or more pay tables, game information, one or more help menus, one or more secondary games, progressive jackpot information or tournament game information) or non-game related information (e.g., news, advertisements, messages or promotions).

As shown in FIG. 1B, the top box 12 has been moved in a vertical direction away from the top of the main cabinet 14 to reveal a secondary display 16. The secondary display 16 may be a flat panel display, dot matrix display, cathode ray tube display, display glass, backlit display glass, diorama, three-dimensional relief, pachinko-style secondary game, one or more wheels, plurality of mechanical reels, or a combination thereof. The display 16 may have a wide screen aspect ratio (4:3, 16:9, 16:10 or the like) and the display may or may not include a touch screen or other touch device associated therewith. In one embodiment, the secondary display 16 is coupled to the bottom of the top box 12. Alternatively, the secondary display 16 is fixed to the top of the main cabinet 14. In other embodiments, the secondary display 16 is pivotally coupled to either the top box 12 or the main cabinet.

FIG. 1B shows one embodiment of a means for moving the top box 12. More specifically, the means for moving the top box 12 includes a motor 20 or other drive mechanism known or developed in the art and a force transmission means. As shown in FIG. 1B, the force transmission means includes a track 18 or other guiding member that may be used to move the top box in a vertical direction. In one embodiment, a rack and pinion system is coupled to the motor 20 to move the top box 12. In other embodiments, the drive mechanism is coupled to a belt and pulley system, helical gears, bevel gears, work gears, four-bar linkage system, six-bar chain, extendable struts, scissor lift, boom lift, or other mechanisms know or developed in the art. Alternatively, one or more pneumatic shocks or struts may be coupled to and span between the top box 12 and the main cabinet 14. In yet another embodiment, a linear actuator (e.g., screw and motor) may be used to raise and lower the top box 12. The linear actuator is capable of lifting top boxes of different weights and at different speeds.

Figure 2B:
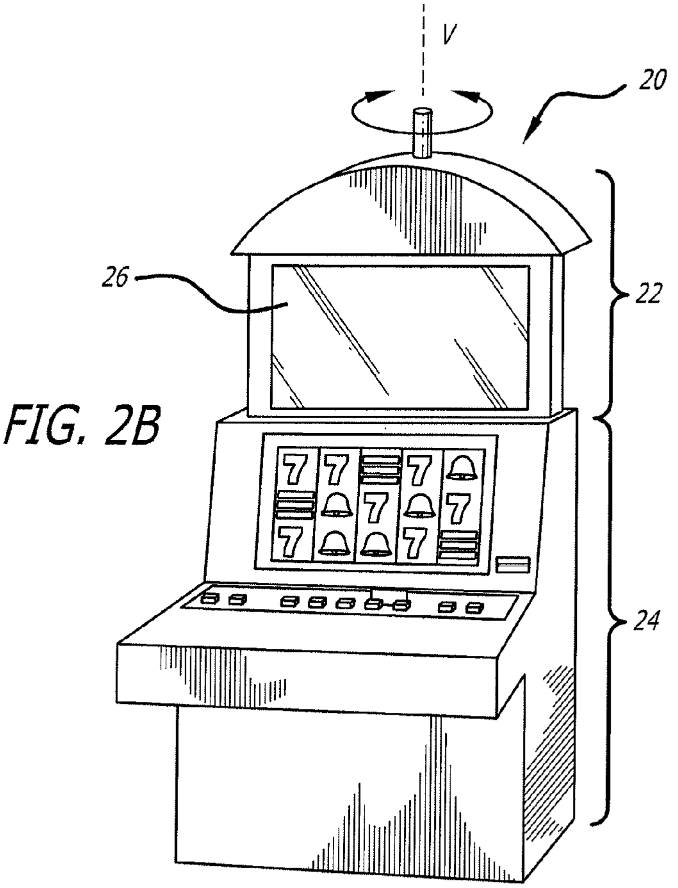
FIG. 2B is a perspective view of the gaming machine of FIG. 2A with the top box in an extended position.
Figure 2C:
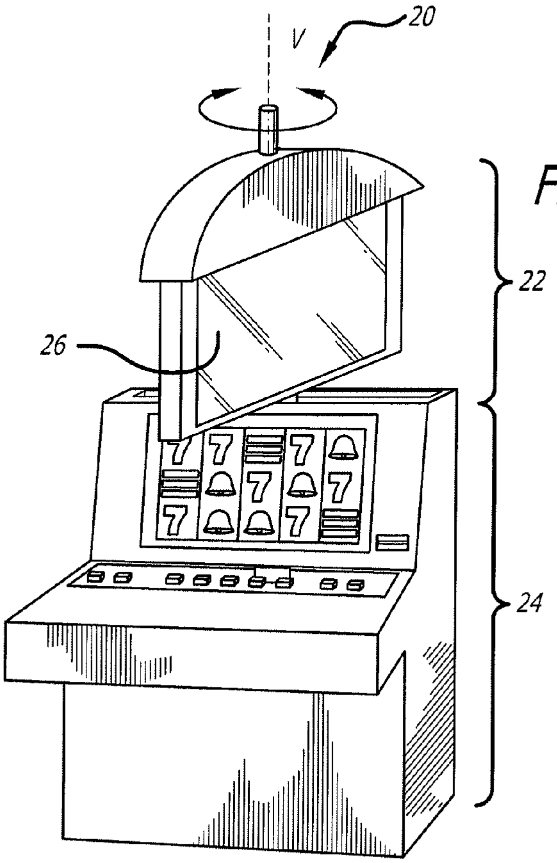
FIG. 2C is a perspective view of the gaming machine of FIG. 2A with the top box rotating.
Figure 2D:
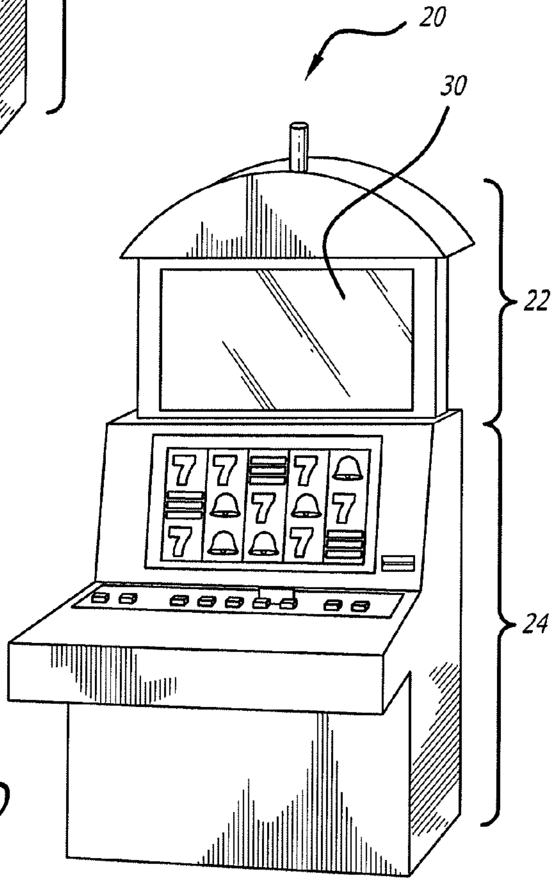
FIG. 2D is a perspective view of the gaming machine of FIG. 2A with the top box stopped at a second position.

FIGS. 2A-D illustrates another embodiment of a gaming machine 20 having a movable top box 22. As shown in FIG. 2B, the top box 22 is extended from the main cabinet 24 of the gaming machine 20 to reveal a secondary display 26. In this embodiment, the secondary display 26 is secured to the top box 22. Accordingly, the top box 22 and the secondary display 26 are able to rotate about a vertical axis V as shown in FIGS. 2B-C. Optionally, the gaming machine 20 includes one or more motion sensors (not shown) or pinch sensors (not shown) to stop the rotation of the top box 22 if an obstruction is in the path of the top box and the display 26. In various embodiments, the sensors may be infrared, optical or radiofrequency sensors. Of course, any type of sensor may be used herein. Additionally, the sensors may be used to stop the rotation of the top box 22 when the top box has achieved its final stopping position as shown in FIG. 2D. According to one embodiment, as shown in FIG. 2D, the back 28 of the top box 22 includes another display 30.

Figure 2E:
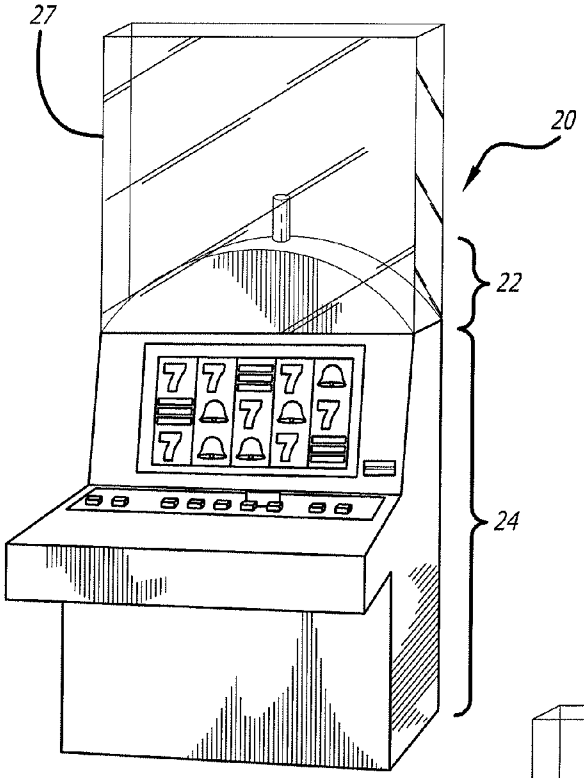
FIG. 2E is a perspective view of one embodiment of a movable top box having a safety device surrounding the movable top box.
Figure 2F:
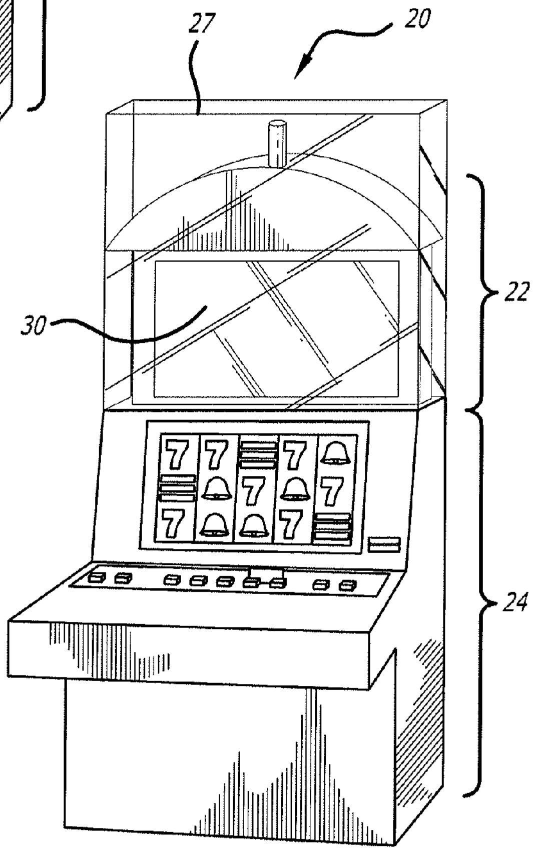
FIG. 2F is a perspective view of the movable top box of FIG. 2E in an extended position.

In yet another embodiment, as shown in FIG. 2E, an acrylic box 27 may be used to surround the top box 22. Accordingly, the acrylic box 27 is sized to surround the top box 22 to prevent injury (e.g., pinched or crushed fingers, or hair pulls) to a casino patron when the top box is moving. Alternatively, an acrylic shield 29 may be provided in front and/or around at least a portion of the sides of the gaming machines as shown in FIG. 2F. In those embodiments having a carousel or row of gaming machines, a single large piece of clear acrylic-type material may span across the top box of all the gaming machines within the carousel or row of gaming machines.

Referring back to FIGS. 2B and 2D, the secondary displays 26, 30 on the front and/or back of the top box 22 may be a flat panel display, dot matrix display, cathode ray tube display, display glass, backlit display glass, diorama, three-dimensional relief, pachinko-style secondary game, one or more wheels, plurality of mechanical reels, or a combination thereof. In an alternate embodiment, the front of the revealed display of the top box 22 is a blank space or a display glass and the back of the top box rotates to reveal a secondary display 30. Again, any displays may have any aspect ratio and a touch screen or touch device associated therewith.

Figure 3A:
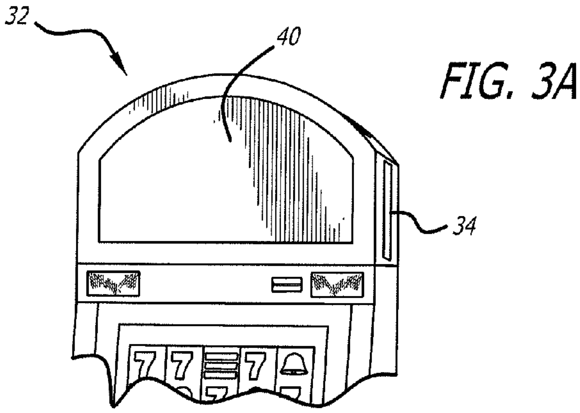
FIG. 3A is a perspective view of one embodiment of a top box of a gaming machine.
Figure 3B:
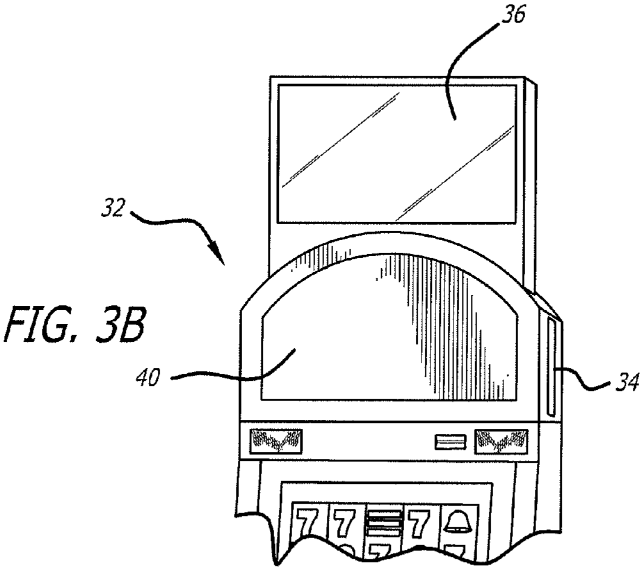
FIG. 3B is a perspective view of the top box of FIG. 3A with a display screen in an extended position.
Figure 3C:
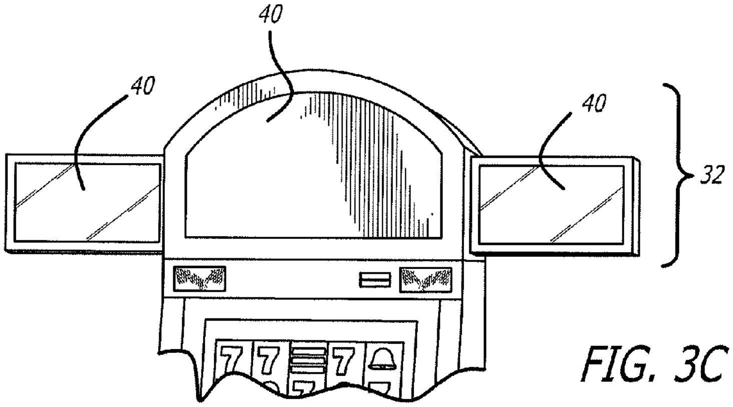
FIG. 3C is a perspective view of the top box of FIG. 3A with display screens in an extended position.

Turning now to FIGS. 3A-3C, another embodiment of a top box 32 is shown. The top box 32 includes one or more displays that may be extended through openings 34 of the top box. As shown in FIG. 3B, a single extendable display 36 is extended through the top portion of the top box 32. In another embodiment, two displays are extended through the sides of the top box. In yet another embodiment (not shown), a single display is extended through one side of the top box through an opening. As shown in FIG. 3C, the top box 32 includes two extendable displays 40 extending through openings 34 on the sides of the top box. In these various embodiments shown in FIGS. 3A-3C, a secondary game or game-related information may be presented on the fixed display 40 of the top box in addition to the extendable displays 36, 40.

Figure 4A:
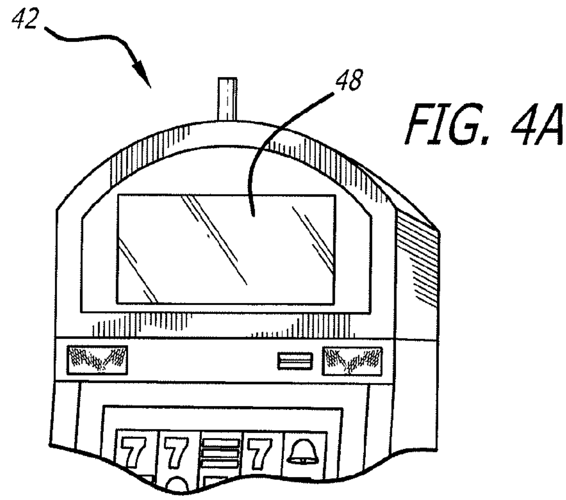
FIG. 4A is a perspective view of another embodiment of a top box of a gaming machine in a closed position to reveal a set of display screens.
Figure 4B:
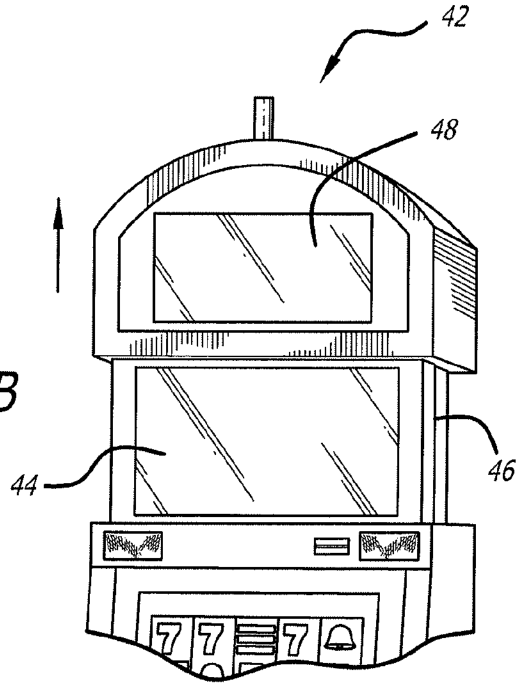
FIG. 4B is a perspective view of the top box of FIG. 4A with the display screens in a partially extended position.
Figure 4C:
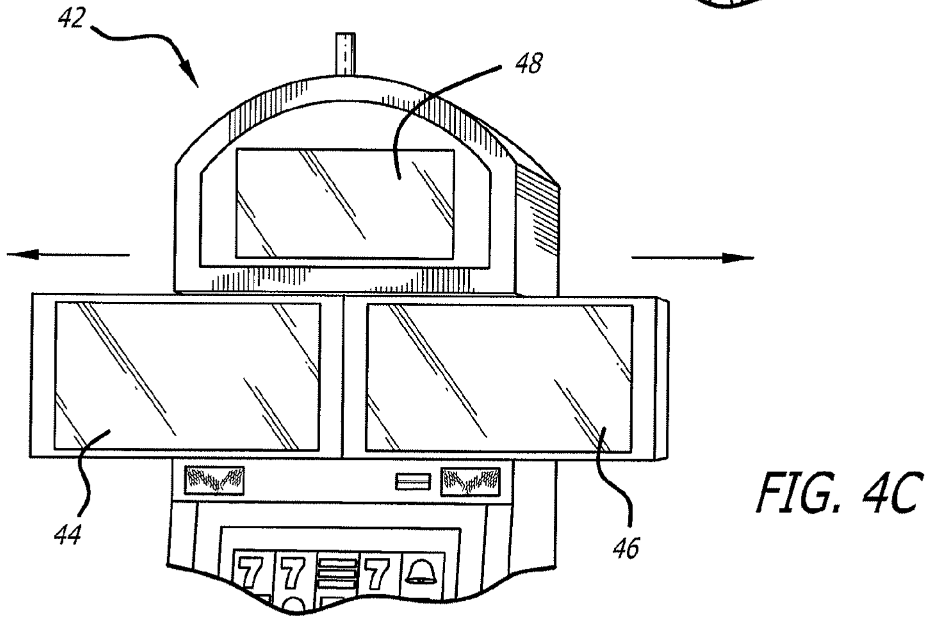
FIG. 4C is a perspective view of the top box of FIG. 4A with the display screens in a fully extended position.

FIGS. 4A-C illustrate another embodiment of a movable top box 42 having a plurality of extendable, nested displays 44, 46. In this embodiment, the secondary displays 44, 46 are revealed when the top box 42 is moved away from the main cabinet of the gaming machine as shown in FIG. 4B. In FIG. 4B, a single display 44 is presented to the player, and second display 46 is positioned behind the front display 44. In response to a triggering event, the secondary displays 44, 46 are moved in opposite directions and stop in their respective final positions, as shown in FIG. 5C. As shown in FIG. 5C, the secondary display positioned behind the front display is moved forward such that the secondary displays are flush with one another. The top box 42 includes a drive mechanism to not only extend the secondary displays 44, 46, but also to move one display 46 forward such that the displays are flush with one another. Alternatively, the top box 42 may only include a drive means to laterally move the displays 44, 46. Additionally, the top box 42 includes a fixed display 48 that may present a secondary game, game-related information, game marquee, advertisements, messages, news, promotional information or the like.

Figure 5A:
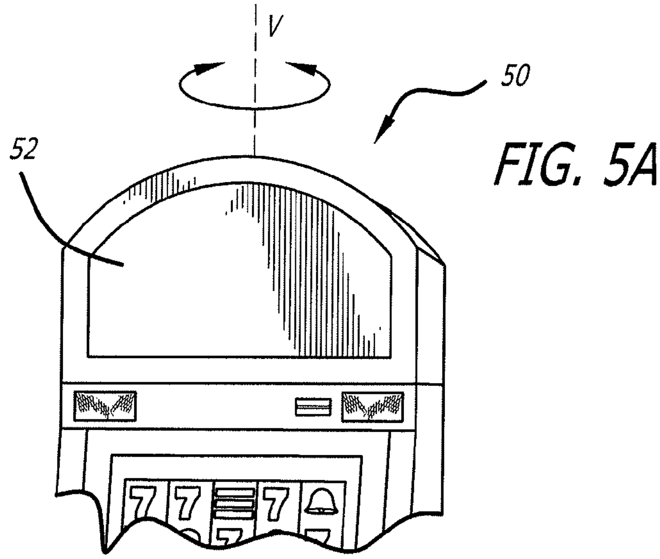
FIG. 5A is a perspective frontal view of one embodiment of a top box.
Figure 5B:
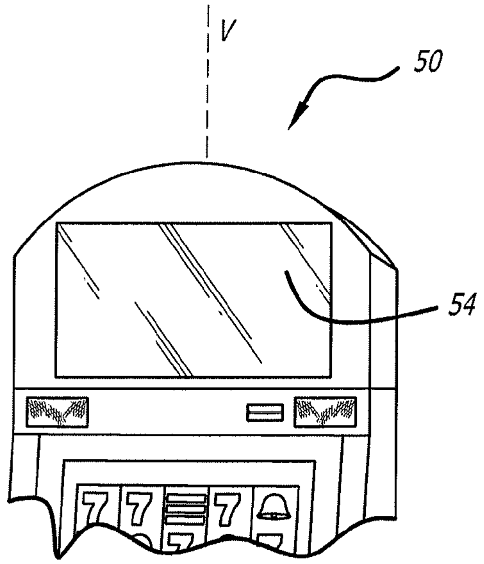
FIG. 5B is a perspective frontal view of the top box of FIG. 5A wherein the top box is rotated to display the back surface of the top box.

FIGS. 5A-5B illustrates another embodiment of a movable top box 50. The top box 50 is attachable to or adapted to any type of gaming machine cabinet. As shown in FIG. 5A, the front panel of the top box includes a top glass display 52. The top glass 52 may include game name, game marquee, pay table, game instructions, or any other information. Alternatively, the top box 50 includes a secondary display (not shown) on the front surface of the top box. The secondary display may be flat panel display, dot matrix display, cathode ray tube display, diorama, three-dimensional relief, pachinko-style secondary game, one or more wheels, plurality of mechanical reels, or a combination thereof. Any display aspect ratio as well as use with or without a touch screen or other touch device is also envisioned.

In the embodiment shown in FIGS. 5A-5B, the top box 50 is rotatably coupled to the main cabinet. Accordingly, the top box 50 is able to rotate about a vertical axis V. FIG. 5B illustrates the back surface of the top box 50. The back surface includes another display 54 that may be a flat panel display, dot matrix display, cathode ray tube display, display glass, backlit display glass, diorama, three-dimensional relief, pachinko-style secondary game, one or more wheels, plurality of mechanical reels, or a combination thereof.

In alternate embodiments, the top box (not shown) is coupled to the main cabinet of the gaming machine so that the top box may tilt toward or away from the player. In yet another embodiment, the top box (not shown) is coupled to the main cabinet such that the top box may flip or otherwise rotate around a horizontal axis. In these various embodiments of the movable top box, the movement of the top box may be in response to one or more triggering events.

Figure 6:
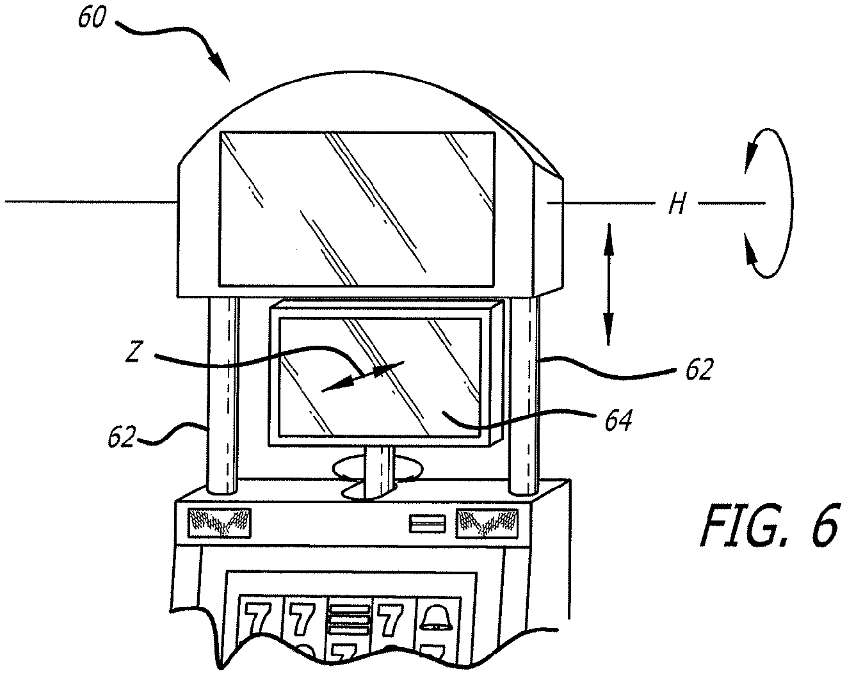
FIG. 6 is a perspective view of another embodiment of an extendable top box.
Figure 8:
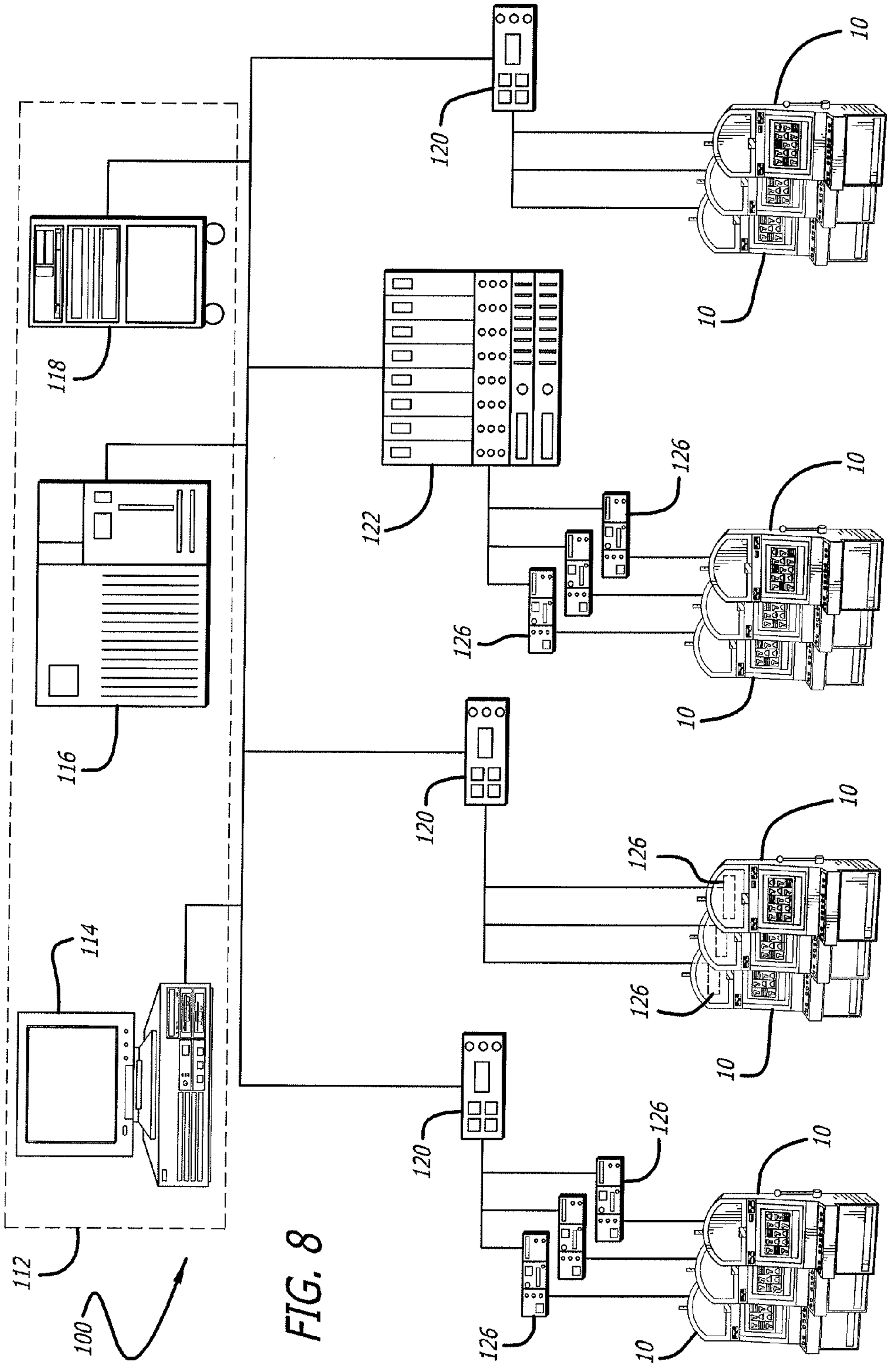
FIG. 8 is a diagram of one embodiment of a gaming system including gaming machines having extendable top boxes.

FIG. 6 illustrates yet another embodiment of an extendable top box 60. In this embodiment, the top box 60 is extended away from the main cabinet via a pair of extendable struts 62. As shown in FIG. 6, a secondary display 64 is revealed when the top box 60 is fully extended. In this embodiment, the secondary display 64 is rotatable about a vertical axis V. Additionally, the secondary display 64 may be moved toward or away from the player in along a Z axis. In another embodiment, the secondary display 64 may be tilted toward or away from the player. Alternatively, the secondary display (not shown) is simply fixed in a permanent position.

In still another embodiment, the secondary display (not shown) is mounted to the main cabinet via one or more struts. In this embodiment, the secondary display may be rotated in along a horizontal axis H. That is, the secondary display is flipped so that the back surface of the secondary display is shown. Accordingly, in this embodiment, the secondary display may include displays on both the front and back surfaces.

FIGS. 7A-7B illustrate yet another embodiment of a movable top box 70. FIG. 7A shows the movable top box 70 in a closed position. The top box 70 includes one or more top box displays 72, 74 that are fixed within the top box. The displays 72, 74 extend out from the surface of the top box 70 (i.e., the display is not flush with the surface of the top box). Alternatively, the displays 72, 74 are movable (e.g., tilted a few degrees downward or upward) so that the displays are more easily viewed by a casino patron. The movement of the display may be done by manually or automatically (e.g., motor or linear actuator).

FIG. 7B illustrates the top box 70 is in an extended position. The top box 70 is moved via a linear actuator 80 or other means to reveal a secondary display 76. The secondary display 76 of the top box 70 are flush with the surface of the top box in order to minimize any surfaces in which a player's fingers, hands, arms, hair, personal effects may be pinched or crushed when the top box moved from the extended position to the closed position. That is, the flush surface between the secondary display 76 and the main cabinet does not provide any ridges or surfaces (perpendicular to the movement of the top box) in which a finger may be crushed or pinched. Additionally, in one embodiment, the top box 70 includes raised rails 78 that are parallel to the direction in which the top box 70 may move. Furthermore, minimal clearance between the rails 78 and the top box are provided to present or minimize possible pinch points. In another embodiment, rubber gaskets or foam padding may be provided in the gaps between the movable top box 70 and the rails 78 or other portions of the top box to minimize the number of pinch points and to prevent any liquid from entering the top box.

Additionally, as shown in FIGS. 7A-7B, the top box 70 includes a candle 82. As shown in FIGS. 7A-7B, the candle 82 includes three tiers. As those skilled in the art will appreciate, other embodiments of the candle 82 may include one or more tiers. The tiers may be jointly or individually illuminated with one or more incandescent light bulbs or light emitting diodes (LEDs). In one embodiment, the bottom tier 84 of the candle 82 includes a plurality of multi-colored LEDs. Additionally, a plurality of LED reflectors (not shown) are provided within the bottom tier 84 of the candle. For example, in one embodiment, eight reflectors are provided within the bottom tier in a octagonal configuration (when viewed from above). Accordingly, the LEDs in the bottom tier 84 of the candle may be alternately illuminated (in the same or different colors) around the circumference of the bottom tier to simulate a rotating light. Alternatively, the LEDs may flash in one or more colors. Accordingly, the LEDs in the bottom tier 84 of the candle 82 may be programmed to illuminate when the top box 70 is raised and/or lowered in response to a triggering event or during the attract mode of the game. Additionally, sound effects or music may accompany the movement of the top box 70. The lights in the top tiers of the candle 82 may be illuminated to signal that a player needs assistance from a casino floor employee or to signal that a jackpot has been won.

Referring back to FIG. 1, the main cabinet 14 of the gaming machine 10 is a self-standing unit that is generally rectangular in shape. In the embodiment shown in FIG. 2, the main cabinet 24 is a slant-top gaming cabinet. Alternatively, in other embodiments, the gaming cabinet may be any shaped cabinet known or developed in the art that may include a top box. Additionally, the cabinet may be manufactured with reinforced steel or other rigid materials that are resistant to tampering and vandalism. Optionally, in an alternate embodiment, the gaming machine 10 may instead be a cinema-style gaming machine (not shown) having a widescreen display, as disclosed in U.S. application Ser. No. 11/225,827, entitled "Ergonomic Gaming Cabinet," filed on Sep. 12, 2005, which is hereby incorporated by reference.

As shown in FIGS. 1A-2D, the gaming machines 10, 20 include a main display 17. According to one embodiment, the main display 17 is a plurality of mechanical reels for presenting a slot-style game. Alternatively, the main display 17 is a video display for presenting one or more games such as, but not limited to, mechanical slots, video slots, video keno, video poker, video blackjack, video roulette, Class II bingo, games of skill, games of chance involving some player skill, or any combination thereof.

According to one embodiment, the main display 17 is a widescreen display (e.g., 16:9 or 16:10 aspect ratio display). In one embodiment, the display 17 is a flat panel display including by way of example only, and not by way of limitation, liquid crystal, plasma, electroluminescent, vacuum fluorescent, field emission, LCOS (liquid crystal on silicon), and SXRD (Silicon Xtal Reflective display), or any other type of panel display known or developed in the art. These flat panel displays may use panel technologies to provide digital quality images including by way of example only, and not by way of limitation, EDTV, HDTV, or DLP (Digital Light Processing).

According to one embodiment, the widescreen display 17 may be mounted in the gaming cabinet 14 in a portrait or landscape orientation. In another embodiment, the game display 17 may also include a touch screen or touch glass system (not shown). The touch screen system allows a player to input choices without using any electromechanical buttons 13. Alternatively, the touch screen system may be a supplement to the electromechanical buttons 13.

The main cabinet 14 of the gaming machine also houses a game management unit (not shown) that includes a CPU, circuitry, and software for receiving signals from the player-activated buttons 13 and a handle 15, operating the games, and transmitting signals to the respective game display 17 and speakers 19.

In various embodiments, game program may be stored in a memory (not shown) comprising a read only memory (ROM), volatile or non-volatile random access memory (RAM), a hard drive or flash memory device or any of several alternative types of single or multiple memory devices or structures.

As shown in FIGS. 1A-2D, the gaming machines 10, 20 include a plurality of player-activated buttons 13. These buttons 13 may be used for various functions such as, but not limited to, selecting a wager denomination, selecting a number of games to be played, selecting the wager amount per game, initiating a game, or cashing out money from the gaming machine 10, 20. The buttons 13 function as input mechanisms and may include mechanical buttons, electromechanical buttons or touch screen buttons. In another embodiment, one input mechanism is a universal button module that provides a dynamic button system adaptable for use with various games, as disclosed in U.S. application Ser. No. 11/106,212, entitled "Universal Button Module", filed Apr. 14, 2005 and U.S. application Ser. No. 11/223,364, entitled "Universal Button Module", filed Sep. 9, 2005, which are both hereby incorporated by reference. Additionally, other input devices, such as but not limited to, touch pad, track ball, mouse, switches, toggle switches, are included with the gaming machine to also accept player input. Optionally, a handle 15 may be "pulled" by a player to initiate a slots-based game.

In an alternate embodiment, a cellular phone or other input device (e.g., PDA), separate and apart, from the gaming machine 10, 20 may also be used to input various player choices and information to enhance the player's interactive experience with the gaming machine. Furthermore, inputting information via these devices provides an added level of security as any key presses may be hidden from view. In yet another embodiment, a player may call or send a text message or a short message service (SMS) to the gaming machine.

As shown in FIGS. 1A-2D, the gaming machines 10, 20 include a ticket reader/ticket printer slot 21 that is associated with a cashless gaming system (not shown). As shown in FIGS. 1A-2D, a single slot 21 is used for the ticket reader and ticket printer. Accordingly, the same slot 21 may be used to insert and/or issue a ticket. However, in alternate embodiments, separate slots (not shown) may be provided for the ticket acceptor and the ticket printer. In one embodiment, the ticket reader (not shown) of the cashless gaming system is capable of accepting previously printed vouchers, paper currency, promotional coupons, or the like. The ticket printer (not shown) of the cashless gaming system generates vouchers having printed information that includes, but is not limited to, the value of the voucher (i.e., cash-out amount) and a barcode that identifies the voucher.

Additionally, the gaming machines 10, 20 include a player tracking system. The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on the gaming machine 10, 20. These input components include, but are not limited to, a slot 23 for receiving a player tracking card, a keypad or equivalent, an electronic button receptor, a touch screen and the like. The player tracking system may also include a database of all qualified players (i.e., those players who have enrolled in a player rating or point accruing program). Generally, the database for the player tracking system is separate from the gaming machines.

In another embodiment, the gaming machines 10, 20 include an internet connection or other known network connections to link one or more gaming machines together. According to one embodiment, the internet connection is used for web browsing, prize redemption, or access to other gaming or non-gaming information. Additionally, with the various gaming machines in communication with one another (or a system host), the gaming machines 10, 20 may participate in a gaming tournament. In one embodiment, the gaming tournament is a competitive gaming tournament having one (or a few) winners. Alternatively, the gaming tournament is a cooperative gaming tournament where all eligible gaming machines win a particular award.

According to one embodiment, the start of the tournament may be signified by the movement of the top box 12 in a vertical direction. For example, the top box (not shown) may be fashioned to look like a rocket ship with accompanying sound and/or smoke effects. Alternatively, the top box may move incrementally upwards as the tournament progresses. Accordingly, a player may have a visual idea of their relative position in the tournament game based upon the height of the top box.

One of ordinary skill in the art will appreciate that not all gaming machines have all these components and may have other components in addition to, or in lieu of, those components mentioned here. Furthermore, while these components are viewed and described separately, various components may be integrated into a single unit in some embodiments.

Referring now to FIG. 7, a casino gaming system 100 is illustrated. The casino gaming system 100 comprises one or more gaming machines 10. In various embodiments, any of the gaming machines 10 may be any type of electronic or mechanical gaming devices, such as, but not limited to, a mechanical reel spinning slot machine, video slot machine, video poker machine, keno machine, video blackjack machine, or a gaming machine offering one or more of the above-described games. Examples include, but are not limited to, the S6000 mechanical reel spinner and the Alpha video slot machine from Bally Technologies, Inc. The gaming machines 10, 20 illustrated in FIG. 7 act as terminals for interacting with a player playing a casino game. Networking components facilitate communications between the system server 112 and game management units 126 that control displays for carousels of gaming machines 10 across a network 740. Game management units (GMU's) 126 connect gaming machines to networking components and may be installed in the gaming machine cabinet or external to the gaming machine 10. The function of the GMU 126 is similar to the function of a network interface card connected to a desktop personal computer (PC). Some GMU's 126 have much greater capability and can perform such tasks as presenting and playing a game using a display (not shown) operatively connected to the GMU 126. In one embodiment, the GMU 126 is a separate component located outside the gaming machine 10. Alternatively, in another embodiment, the GMU 126 is located within the gaming machine 10. Optionally, in an alternative embodiment, one or more gaming machines 10 connect directly to a network and are not connected to a GMU 126.

Furthermore, one or more of the gaming machines 10 includes one or more data repositories for storing data. Examples of information stored by the gaming machines 10 include, but are not limited to, accounting data, maintenance history information, short and/or long-term play data, real-time play data, and sound data. The sound data may include, but is not limited to, audio files, sound clips, wav files, mp3 files and sound files saved in various other formats. Furthermore, each gaming machine 10 comprises an audio system (not shown) for outputting sound.

The gaming machines 10 are connected via a network to a network bridge 120, which is used for networking, routing and polling gaming machines, including slot machines. The network bridge 120 connects to a back end system 112. Optionally, the gaming machines 10 may connect to the network via a network rack 122, which provides for a few number of connections to the back end system 112. Both network bridge 120 and network rack 122 may be classified as middleware, and facilitate communications between the back end system 112 and the game management units 126. The network bridges 120 and network rack 122 may comprise data repositories for storing network performance data. Such performance data may be based on network traffic and other network related information. Optionally, the network bridge 120 and the network rack 122 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The back end system 112 may be configured to comprise one or more servers. The type of server employed is generally determined by the platform and software requirements of the gaming system. In one embodiment, as illustrated in FIG. 7, the back end system 112 is configured to include three servers: a slot floor controller 114, a casino management server 116 and a casino database 118. The slot floor controller 114 is a part of the player tracking system for gathering accounting, security and player specific information. The casino management server 116 and casino database 118 work together to store and process information specific to both employees and players. Player specific information includes, but is not limited to, passwords, biometric identification, player card identification, and biographic data. Additionally, employee specification information may include biographic data, biometric information, job level and rank, passwords, authorization codes and security clearance levels.

Overall, the back end system 112 performs several fundamental functions. For example, the back end system 112 can collect data from the slot floor as communicated to it from other network components, and maintain the collected data in its database. The back end system 112 may use slot floor data to generate a report used in casino operation functions. Examples of such reports include, but are not limited to, accounting reports, security reports, and usage reports. The back end system 112 may also pass data to another server for other functions. Alternatively, the back end system 112 may pass data stored on its database to floor hardware for interaction with a game or game player. For example, data such as a game player's name or the amount of a ticket being redeemed at a game may be passed to the floor hardware. Additionally, the back end system 112 may comprise one or more data repositories for storing data. Examples of types of data stored in the system server data repositories include, but are not limited to, information relating to individual player play data, individual game accounting data, gaming machine accounting data, cashable ticket data, and sound data including optimum audio outputs for various casino settings.

Of course, one will appreciate that a gaming system 100 may also comprise other types of components, and the above illustrations are meant only as examples and not as limitations to the types of components or games used in a casino gaming system having a multi-hand blackjack element.

In addition to gaming machines and gaming systems, various methods for managing gaming machines having movable top boxes are disclosed herein. According to one method, a player initiates a gaming session. Typically, the player inserts credit onto the gaming machine, places a wager, and initiates game play. Once game play is initiated, one or more game outcomes are presented on the main display 17. According to one method, the top box of the gaming machine will move in response to a triggering event. The movement of the top box includes the movement of the top box in a vertical direction, flipping the top box 180°, rotating the top box about a vertical axis, tilting the top box away from or toward a player, or oscillating the motion of the display. In another method, the movement of the top box in a vertical direction reveals a secondary display that is positioned behind or within the top box. In one method, the secondary display may also move in the x,y,z directions in response to one or more triggering events.

The triggering event is a condition that needs to be satisfied in order to move the top box or the secondary display. According to one embodiment, the triggering event is a computer or system generated response such as, but not limited to, a message from a system host, a message from another networked gaming machine, or a winning outcome in a primary game. For example, the triggering event may be a symbol combination of "cherry-cherry-cherry" for a slots-type game. In a poker game, the triggering event may be a pair of jacks or better. In other embodiments, the triggering event may be any winning outcome having a low or high probability. In those embodiments where a gaming machine presents both a primary game and a secondary game, the triggering event may be an outcome in either the primary or the secondary game. The primary game and/or the secondary game may be a video game or a mechanical game (e.g., a game having one or more reels or wheels). As those skilled in the art will appreciate, the triggering event may be any possible game outcome and does not necessarily have to be a winning outcome.

Additionally, triggering events may be based upon player activity/actions. For example, the triggering event may be based upon player performance such as, but not limited to, inserting a player tracking card into the gaming machine, time of play, frequency of play (i.e., number of games played in a particular period of time), number of maximum bets, number of player points earned, or a combination thereof. Additionally, a triggering event may be the player possessing a radiofrequency identification (RFID) tag while playing a gaming machine or walking by one or more gaming machines to trigger an attract mode of a game. In these embodiments, a random performance characteristic may be selected to initiate the single-player-initiated, grouped bonus period. For example, the bonus period may be triggered when a player has played the game for 30 minutes. Alternatively, achieving a predetermined performance threshold for a particular performance characteristic may be required to initiate the limited-time bonus period. For example, a bonus period may be initiated when a player has made twelve maximum bets. In another embodiment, the triggering event may be based upon the number of credits on the gaming machine. That is, a random or predetermined number of credits will trigger the bonus period. As those skilled in the art will appreciate, one or more of any of the disclosed triggering events may be required to initiate the movement of the top box.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming machine, comprising:

a main cabinet having a first display for presenting a game; and an extendable top box coupled to the top of the main cabinet, wherein the extendable top box includes a front surface and an opposite back surface, wherein the bottom edge of the front surface of the extendable top box abuts the top of the main cabinet in a first position, and the gaming machine having a first overall height when the extendable top box is in the first position, and wherein the bottom edge of the front surface of the top box is in a vertical position located away from the top of the main cabinet in a second position and the gaming device having a second overall height when the extendable top box is in the second position, wherein the second overall height is greater than the first overall height, wherein the extendable top box moves from the first position to the second position in response to a triggering event occurring during play of the game, and the top box is visible to a player in both the first position and the second position.

2. The gaming machine of claim 1, wherein a secondary display is revealed to a player when the top box is in the second position, wherein the secondary display is a flat panel display, wide screen display, dot matrix display, cathode ray tube display, display glass, diorama, three-dimensional relief, pachinko-style secondary game, one or more wheels, plurality of mechanical reels, or a combination thereof.

3. The gaming machine of claim 1, wherein the top box includes a fixed display on the front surface, back surface, or both the front and back surface of the top box.

4. The gaming machine of claim 3, wherein the top box further comprises a means for rotating the top box to reveal the back surface of the top box.

5. The gaming machine of claim 3, wherein the top box further comprises a means for moving the top box in a direction toward or away from the front of the gaming machine.

6. The gaming machine of claim 3, wherein the fixed display is a flat panel display, dot matrix display, cathode ray tube display, display glass, diorama, three-dimensional relief, pachinko-style secondary game, wheel, plurality of mechanical reels, or a combination thereof.

7. A gaming machine, comprising:

a main cabinet having a first display for presenting a game;

an extendable top box coupled to the top of the main cabinet, wherein the top box abuts the top of the main cabinet in a first position and the gaming device has a first height in the first position, and wherein the top box is moved in a vertical direction relative to the top of the main cabinet to a second position having a second height, wherein the second height is greater than the first height;

a means for moving the extendable top from the first position to the second position, wherein the extendable top box is moved from the first position to the second position in response to a trigger event occurring during the game, and wherein the top box is visible to a player in both the first position and the second position; and a second display positioned within the extendable top box, wherein the secondary display is not visible when the extendable top box is in the first position, and wherein the secondary display is visible when the extendable top box is in the second position.

8. The gaming machine of claim 7, wherein the secondary display is a flat panel display, wide screen display, dot matrix display, cathode ray tube display, display glass, diorama, three-dimensional relief, pachinko-style secondary game, one or more wheels, plurality of mechanical reels, or a combination thereof.

9. The gaming machine of claim 7, wherein the secondary display includes a first surface opposite a second surface, and wherein the secondary display is rotatable about a vertical axis of rotation.

10. The gaming machine of claim 9, wherein at least the first surface includes a flat panel display, wide screen display, dot matrix display, cathode ray tube display, display glass, diorama, three-dimensional relief, pachinko-style secondary game, one or more wheels, plurality of mechanical reels, or a combination thereof.

11. The gaming machine of claim 7, wherein the secondary display includes a first flat panel display and a second flat panel display positioned behind the first flat panel display, wherein the second flat panel display is moved to a position adjacent to the first flat panel display to form a widescreen display when the top box is in the second position.

12. The gaming machine of claim 7, wherein the top box further comprises a means for rotating the top box to reveal the back surface of the top box.

13. The gaming machine of claim 6, wherein the top box further comprises a means for moving the top box in a direction toward or away from the front of the gaming machine.

14. The gaming machine of claim 7, wherein the top box includes a fixed display on the front surface, back surface, or both the front and back surface of the top box.

15. The gaming machine of claim 14, wherein the fixed display is a flat panel display, wide screen display, dot matrix display, cathode ray tube display, display glass, diorama, three-dimensional relief, pachinko-style secondary game, wheel, plurality of mechanical reels, or a combination thereof.

16. A gaming machine, comprising:

a main cabinet having a first display for presenting a game;

an top box rotatably coupled to the top of the main cabinet, wherein the top box includes a top surface, a front surface coupled to a first edge of the top surface and an opposite back surface coupled to a second edge of the top surface, wherein the first edge is opposite the second edge, wherein the front surface of the top box is visible in a first position, and the back surface of the top box is visible in a second position, and wherein the axis of rotation of the top box is normal to the top surface of the extendable top box; and a means for rotating the top box between the first position and the second position, wherein the top box moves from the first position to the second position in response to a triggering event occurring during play of the game, and the top box is visible to a player in both the first position and the second position.

17. The gaming machine of claim 16, further comprising a means for vertically moving the top box away from the top of the main cabinet.

18. The gaming machine of claim 16, wherein the top box includes a fixed display on the front surface, back surface, or both the front and back surface of the top box.

19. The gaming machine of claim 18, wherein the fixed display is a flat panel display, dot matrix display, cathode ray tube display, display glass, diorama, three-dimensional relief, pachinko-style secondary game, wheel, plurality of mechanical reels, or a combination thereof.

20. The gaming machine of claim 17, further comprising a display that is visible to a player when the top box is fully extended.

* * * * *